United States Patent Office 3,145,163
Patented Aug. 18, 1964

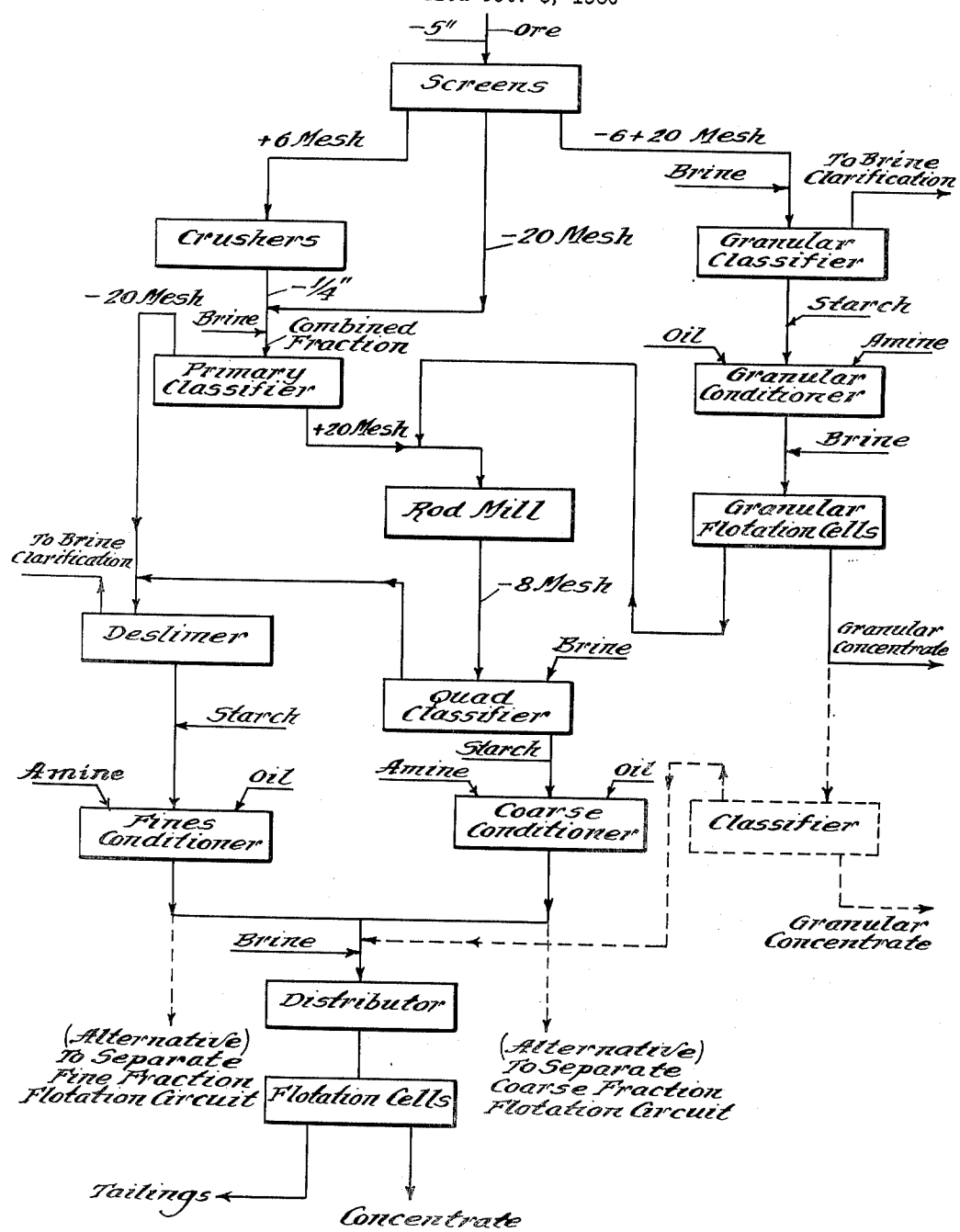

3,145,163
BENEFICIATION OF POTASH ORES
William B. Dancy and Clarence E. Pressnell, Carlsbad, N. Mex., assignors to International Minerals & Chemical Corporation, a corporation of New York
Filed Oct. 3, 1960, Ser. No. 59,978
19 Claims. (Cl. 209—12)

The present invention generally relates to the beneficiation of potash ores. More particularly, it relates to an improved process for the recovery of sylvite from ores of the sylvinite type; for example, such ores as are found in the Permian basin of the southwest area of the United States and mined chiefly in the Carlsbad district of New Mexico, and as are found in the Williston basin of the United States and Canada. The process is, however, applicable to the treatment of other potash ores wherein sylvite is associated with other minerals.

As is well known, potash is of great economic importance. Extensive deposits of potash salts are found on every continent. However, in practically no instance is the potash salt found in a substantially pure form. On the North American continent, one frequently encountered potash salt is sylvite (KCl). The sylvite is not often found in any appreciable quantities as pure KCl but is most often found as sylvinite ore, which is a mixture of sylvite and halite (NaCl). A typical analysis of a sylvinite ore is as follows:

|  | Percent |
|---|---|
| Sylvite (KCl) | 23 |
| Halite (NaCl) | 73 |
| Other constituents or impurities consisting of silicates, sulfates, etc. | 4 |

The potash ore in the Williston basin also generally contains carnallite ($KCl \cdot MgCl_2 \cdot 6H_2O$).

Large amounts of sylvite are recovered from sylvinite ores by processes involving a froth flotation operation. In processes of this general character, it has been the usual practice to grind or crush the ore to a rather fine mesh size, for example to a degree of fineness where at least 90% of the ore would pass through a sieve of about 40 mesh. The recovery of the valuable sylvite constituents from an ore crushed or ground to such a degree of fineness in a froth flotation operation is not too difficult a problem, and various types of collector agents for effecting such flotation can be used.

In a sylvinite flotation process, the potash ore is slurried in a saturated brine solution to produce a brine slurry or pulp containing from about 50% to about 75% solids. The pulp is reagentized or conditioned with a suitable collector, diluted with brine, and passed to a flotation cell. In the flotation cell the pulp is kept in circulation and is contacted with air. Air bubbles adhere to the reagentized sylvite particles and float the sylvite particles. The sylvite float is raked off of the top of the flotation cell. The remaining unfloated pulp, from which substantial amounts of sylvite have been removed, is removed as underflow from the flotation cell and is usually discarded as a tailing. This initial flotation operation is denominated a rougher flotation, the float product is denominated a rougher float or rougher concentrate, and the tailing is denominated a rougher tail.

The rougher concentrate, while containing substantially all of the sylvite values in the charged pulp, also contains a substantial amount of halite particles. Therefore, it is conventional practice to combine the rougher concentrate from the individual flotation cells and subject the combined rougher concentrates to a cleaner flotation operation. The unfloatable pulp recovered from the cleaner flotation cells is usually recycled to rougher cells. The float product from the cleaner operation is recovered as a high grade sylvite product, usually denominated a cleaner concentrate.

The flotation of relatively large particles is, however, in general, attended with considerably more difficulty than when the particles are of relatively smaller size. In other words, it is generally more difficult to float relatively large size sylvite particles than it is to float relatively small sized sylvite particles. It has been observed that the large sylvite particles make up a substantial amount of the sylvite which is not floated and which, therefore, is usually lost in the tailings.

For many purposes, however, it is undesirable to reduce the mineral to a very small particle size. In the manufacture and utilization of fertilizers, for example, which commonly include phosphate rock and sylvite or other potash minerals, the use of such materials in finely divided form gives rise to caking and dusting problems so that granular materials are distinctly preferred, and the demand therefor has greatly expanded within recent years. A need has, therefore, existed for a method of beneficiating such minerals in granular form, so that they are directly available to the market without any necessity for separating them first in powdered form and then reconverting them into granular form.

Methods have already been devised which achieve flotation of granular materials to some extent. In general, potash particles, especially sylvite particles, substantially larger than about 6 mesh are not efficiently floated in any process. Floatable size particles are, therefore, 6 mesh or smaller. The 6 mesh to 20 mesh fraction is generally denominated a granular fraction. The fraction may, however, be −6 +10, −6 +12, etc., and even −6 +28. It is, however, preferable that particles smaller than 28 mesh not be treated along with the coarser material in a flotation cell. Methods for the flotation of granular fractions generally subject an aqueous slurry of the granular material to flotation in the presence of a selective collector reagent such as an amine or a fatty acid, a frothing agent such as an aliphatic alcohol of intermediate molecular weight, and a non-saponifiable oil such as crude petroleum, fuel oil, or kerosene. Recently it has been discovered that the flotation of granular materials is benefited when the flotation mixture contains a viscous petroleum oil having certain characteristics. The viscous petroleum oil preferably has a viscosity at 130° F. greater than about 100 SSU and a distillation range with a 10% point above about 500° F. (ASTM D–447). Many of the so-called "gas oils," lubricating oil stocks, and paraffin or wax distillates obtained in the distillation of crude oils and in the redistillation of cracked stocks and heavy distillates have been found suitable.

Another method suggested by the prior art includes admixing a crushed potash ore with brine and sizing the crushed potash ore in a classifier to provide at least two fractions, a finer fraction composed principally of finer particles of the ore and a coarser fraction composed principally of coarser particles of the ore. The finer fraction is separately conditioned and subjected to a flotation operation in order to beneficiate the fine fraction and provide a product of increased $K_2O$ content. Similarly, the coarser fraction is separately conditioned and subjected to a flotation operation to provide a beneficiated potash fraction of increased $K_2O$ content.

When a potash ore is not ground or crushed so as to produce only very small particles but is ground or crushed to a lesser extent so as to produce floatable granular size particles, it has been found that while the coarser or granular fraction of the ground or crushed ore contains a high proportion of liberated particles, the granular fraction also contains a substantial proportion of locked ore particles which are the true middling. The operating conditions in the granular flotation may be such that these granular middling particles are floated in the granular flotation operation, however, when they are floated, their presence reduces the $K_2O$ content of the product due to the halite in the locked ore particles. When, on the other hand, conditions in the granular flotation operation are controlled to prevent flotation of the middling or locked ore the particles, sylvite content of the middlings reports to the tailings, thereby resulting in substantial losses of $K_2O$ values.

It is an object of the present invention to provide a novel process for beneficiating potash ores.

It is another object of the invention to provide a method of handling middling material in a froth flotation process for beneficiating sylvinite type ores.

These and other objects and advantages of the present invention will be apparent to those skilled in the art as the description of the present invention progresses.

In accordance with the present invention, it has been discovered that eminently satisfactory beneficiation of potash ores and minerals can be achieved by means of a series of critical and interdependent process steps.

Generally described, the present invention is a process for beneficiating a potash ore which comprises subjecting mine run potash ore to a dry sizing operation to separate out a granular flotation feed fraction, separately conditioning said granular flotation feed fraction with a collecting agent and subjecting the conditioned granular fraction to a froth flotation operation.

In order to more fully appreciate the present invention with its many advantages, reference may be made to the accompanying drawing which is a diagrammatic flowsheet illustrating the general application of the process of the invention. The flowsheet is described along with a specific example of the invention. The flowsheet and example are given to illustrate the instant novel process and are not to be construed as limiting the invention thereto.

As hereinbefore set forth, when a potash ore as received from the mine is ground or crushed to an extent that substantially all of the ore is reduced to floatable particle size, the comminuted ore contains a high proportion of liberated particles but it also contains a significant amount of locked (unliberated) ore particles which are the true middlings. As is further hereinbefore set forth, these middling particles present a problem in beneficiation by flotation.

It has now been discovered, and the present invention is partly based on this discovery, that when the ore as received from the mine is dry sized to separate out a fraction of floatable granular size particles, that is relatively large size particles which are amenable to flotation, this fraction contains a significantly smaller proportion of middling particles as compared to a similar size fraction recovered from a crushed ore. In other words, it has been determined that this fraction contains a larger proportion of liberated granular particles. Further illustrating this important point, when a mine run ore, that is an ore as received from the mine which has not been comminuted by crushing or grinding to a substantial extent, is dry-sized to separate out a granular fraction of about —6 +20 mesh size, this —6 +20 mesh contains a lower proportion of locked particles as compared to a —6 +20 mesh fraction recovered from the same ore after the ore is crushed or ground to a substantial degree, for example after it has been crushed to substantially all —¼" size. For example, a —6 +20 mesh fratcion screened from mine run material contained only 1% by weight of middling particles, while when this same ore is crushed and ground to —¼" size and a —6 +20 mesh fraction screened out, the —6 +20 mesh fraction contained 10% by weight of middling particles. It has further been determined that the —6 +20 mesh fraction screened from the mine run material is higher in $K_2O$ than is the same fraction recovered from the ore after it has been substantially crushed and ground.

While it has not been definitely established why a granular fraction separated from mine run ore contains less locked particles than a granular fraction separated from a ground or crushed ore, one theory is that during the mining of the potash ore when the ore is released from the ore body by the use of explosives, the rupturing of the ore occurs to a substantial degree along crystal surfaces. However, when the ore is crushed or ground more breakage appears to occur elsewhere than along crystal surfaces. In other words, the shock wave caused by the detonation of the explosives causes the ore body to break along crystal surfaces. When the breakage is along crystal surfaces, a greater amount of liberated particles, of course, is formed. This merely is one theory and is not given with the intent that the invention be limited thereto.

Therefore, in accordance with the present invention, mine run ore, preferably ore which has been mined with the aid of explosives, is dry sized to produce a granular flotation feed before the mine run ore is subjected to any substantial degree of comminuting by crushing and/or grinding. The ore, when blasted from the mine surface contains some very large boulders, for example 2 to 3 feet in diameter, which may be hand picked or hammered or otherwise comminuted to reduce the particles to about —6 inch size. This comminuting which is usually done in the mine, incidental to reducing the size of very large material so that it can be loaded on cars and transported more readily, is not a substantial degree of crushing and/or grinding. The ore as received from the mine is substantially all of —6 inch size and more usually substantially all of —5 inch size.

The mine run ore is subjected to a dry sizing operation to separate out a granular flotation feed fraction. In a plant scale test, 10,700 tons per day of mine run ore was screened to produce 1,000 tons per day of —6 +20 mesh granular material. The dry sizing may be by any suitable means such as, inter alia, screens, air classifiers, etc. The oversize material (+6 mesh) from this dry sizing operation is comminuted by crushing and/or grinding to reduce substantially all of the particles to —¼" size, and the comminuted material is then combined with the undersize material (—20 mesh) from the dry sizing operation. The combined fraction is then subjected to further treatment as is hereinafter described.

The —6 +20 mesh granular fraction separated during the dry sizing of the mine run ore is separately subjected to a flotation operation in a so-called granular flotation circuit. As is illustrated in the drawing, the granular fraction is slurried with a brine solution which is substantially saturated with respect to sylvite and also substantially saturated with respect to halite and is then introduced into a classifier, usually denominated the granular classifier, for a desliming operation. The granular fraction, as well as the other fractions of the ore, contain water insoluble clays, denominated slimes, and these slimes are preferably removed prior to adding flotation reagent to the fraction. The classifier is of a type suitable for slime removal. The ratio of feed and agitation, as well as other operating variables, are regulated during the desliming operation so as to insure an overflow which contains predominantly —200 mesh particles of the ore and the liberated insoluble slimes. In general, —200 mesh sylvite particles are too small to be efficiently beneficiated in a froth flotation operation. The —200 mesh farction removed from the granular classifier is usually sent to brine clarification thickeners wherein the solids are permitted to settle out so that the clarified brine may be reused. It has been determined that the granular fraction is very readily deslimed.

The deslimed granular material underflow from the granular classifier, that is the granular material from which substantial amounts of the slimes have been removed, is introduced into a granular conditioner wherein the material is treated with flotation reagents. For proper conditioning the material is preferably in the form of a relatively thick pulp, usually from about 50% to about 75% solids content, and, when necessary, brine may be added. In the granular conditioner, the material is preferably conditioned with a cationic collector, a slime controllant and a viscous petroleum oil. A frothing agent may also be added. These materials are conventionally employed in the flotation of sylvite and they are employed in conventional manner and amounts.

The cationic collector includes, inter alia, aliphatic amines such as n-lauryl amine. Other useful collector agents are high molecular weight aliphatic amines of about C-14 to C-20 length carbon chains and their water-soluble acid addition salts, as well as quarternary ammonium salts, preferably the acetate or hydrochlorides, for example, octadecylamine acetate, hexadecylamine hydrochloride, and the like. High molecular weight aliphatic amines and their water-soluble acetate salts are commercially available. The collector floats potassium chloride particles.

The slime controllant is also used in conventional manner and in conventional amount. Various slime control agents are known and starch is preferred. Other slime control agents are the polygylcol and polygylcol ethers disclosed in U.S. Patent No. 2,724,499. Other slime control agents are sold by the Dow Chemical Company and General Mills, Incorporated.

The viscous petroleum oil is also employed in conventional manner and in conventional amounts, generally between about 0.5 and about 5.0 pounds of oil per ton of solids. As is hereinbefore set forth, it has been determined that a more selective and more complete flotation of the granular sylvite from the granular ore mixture is achieved by the use of the viscous petroleum oil. The oil preferably has a pourpoint of 50° F. to 100° F., a viscosity above about 100 SSU at 130° F. and below 300 SSU, preferably above about 150 SSU and should be largely a high-boiling point material, having a distillation temperature (ASTM D-447) above about 500° F. at the 10% distillation level. A further description of suitable oils may be found in Trachta and Rodriguez copending patent application Serial No. 781,462, filed December 19, 1958.

It is also conventional to incorporate in the flotation mixture a suitable frothing agent, such as an aliphatic alcohol of intermediate molecular weight (around $C_4$–$C_{10}$), a preferred example being methyl isobutyl carbinol. Other frothing agents are described in the art.

After conditioning, the slurry is diluted with brine to the desired degree for froth flotation, preferably to a solids concentration between about 20% and about 35% solids, and separately subjected to a froth flotation operation.

The froth product recovered during the granular flotation is a high quality granular sylvite concentrate which may be dried and recovered as product or further treated. As is illustrated in the drawing, the granular flotation concentrate may, however, be further upgraded by classifying the concentrate. Fine halite particles, as well as other fine particles are separated from the classifier as overflow and may be subjected to flotation in the standard flotation circuit. The underflow from the classifier is a high quality granular sylvite concentrate which may be dried and recovered as product or further treated.

The tailings from the granular flotation operation contain (a) liberated coarse particles of halite, (b) liberated coarse particles of sylvite which were not floated in the granular flotation, and (c) locked ore particles, the true middling. As hereinbefore set forth, the operating conditions in the granular flotation cell may be such that these granular middling particles are floated in the granular flotation operation, however, when they are floated, their presence reduces the $K_2O$ content of the product because of the halite in the locked ore particles. On the other hand, when conditions in the granular flotation operation are controlled to prevent flotation of the middling or locked ore particles, the sylvite content of the middlings reported to the tailings which were usually sent to waste. As hereinbefore set forth, the granular flotation feed screened from the mine run ore contains a relatively small amount of locked particles. The flotation of the granular fraction is preferably controlled so that substantially all of the locked particles are not floated but report to the tailings. In order to recover the potash in the tailings, the tailings containing the middling or locked ore particles are preferably comminuted to unlock or liberate a substantial amount of sylvite from halite in the middling particles and the comminuted tailing is then subjected to a flotation operation to produce a sylvite flotation concentrate. In a preferred operation the granular flotation tailings are comminuted in a comminutor in the treatment circuit handling the combined fraction. As is illustrated in the drawing, the tailing from the granular flotation cell is introduced into a rod mill.

Referring back to the combined fraction, which is a combination of the —¼" material from the crushers and the —20 mesh from the screens, this combined fraction is slurried with the brine which is substantially saturated with respect to sylvite and also substantially saturated with respect to halite, and is introduced into a classifier, termed the primary classifier, for a first wet sizing operation. For the sake of simplicity, and in order to present the invention in a clear manner, the sizing in the primary classifier will be considered to be on 20 mesh. Sizing on 20 mesh is preferred since a beneficial split of slimes and sylvite is achieved on this size; however, it will be apparent to those skilled in the art that another mesh size may be used and it is, therefore, to be understood that the sizing may be on another predetermined mesh size. Also, in the prior and subsequent description, which may very readily be followed by referring to the drawing, certain mesh sizes are specified. These specified mesh sizes are also preferred; however, it will again be apparent to those skilled in the art that another mesh size may be used and it is, therefore, to be understood that the sizing may be on other predetermined mesh sizes. The other mesh sizing will preferably be close to the mesh sizes specified in the description.

In the classifier, the operating conditions are maintained so as to obtain a pulp overflow composed principally of —20 mesh particles. This —20 mesh fraction is treated in its own fines circuit which is illustrated in the drawing chiefly in the left hand portion of the drawing. The underflow from the classifier is composed principally of +20 mesh particles and is treated in its own coarse circuit. Directing attention first to the treatment of the +20 mesh or coarse fraction, this fraction also contains a substantial portion of +6 mesh material which is too large for efficient flotation. The +20 mesh fraction is, therefore, introduced into a so-called slime mill, which is illustrated in the drawing as a rod mill for wet grinding to reduce the coarser particles to a suitable size for a flotation feed. It is into this slime mill that the granular flotation tailings are preferably introduced as hereinbefore set forth. In the slime mill the +20 mesh material from the primary classifier and the granular flotation tailings are wet ground. The grinding is preferably done in a rod mill since it has been determined that in a rod mill, very fine particles are not produced in too great an amount. The wet grinding operation is regulated so that the outflow from the rod mill is predominately —8 +20 mesh material. During the wet grinding operation in the rod mill, the middling particles are comminuted so that a substantial amount of liberation of the halite from the sylvite in the middling particles is effected during the wet grinding to —8 mesh. In general, it has been determined that the degree of size reduction in the slime mill depends, to some extent, upon one or more of the following: pulp density of the feed material, relationship between the volume of grinding media and the volume of the mill, the rod charge, the diameter of the rods, and the speed of the mill.

During the comminution in the slime mill, some −20 material is produced and some slimes are further liberated from the material. The rod mill discharge, therefore, is introduced into a so-called quad clasifier for a sizing operation. A brine solution substantially saturated with respect to sylvite and halite is also preferably introduced into the quad classifier. In the quad classifier, the operating conditions are maintained so as to obtain a pulp overflow composed principally of −20 mesh particles and a pulp underflow composed principally of +20 mesh particles. The −20 mesh overflow is introduced into a deslimer in the fines circuit, as is illustrated in the drawing.

The +20 mesh slurry underflow from the quad classifier is introduced into a coarse conditioner wherein the material is treated with a slime controllant in conventional manner and in conventional amounts. A cationic flotation reagent is also added to the conditioner as well as a viscous petroleum oil. In general, the cationic reagents and oil suitable for such use are the same as those described for use in the granular conditioner. The aliphatic amines for the coarse conditioning may be of relatively lower molecular weight as compared to the aliphatic amines used in the granular conditioning. The conditioned coarse material from the coarse conditioner may be passed to a separate coarse fraction flotation circuit or it may be combined with the conditioned fine material as is hereinafter further describer.

Referring back to the primary classifier, the −20 mesh overflow from the primary classifier contains −200 mesh ore and/or slime particles. The −20 mesh fraction from the primary classifier is, therefore, introduced into a primary hydroseparator or deslimer. The −20 mesh material overflowing from the quad classifier is also introduced into this hydroseparator. The hydroseparator is of a suitable type for slime removal. The rates of feed and agitation, as well as other operating variables, are so regulated during the desliming step so as to insure an overflow which contains predominantly −200 mesh particles of the ore and the liberated insoluble slimes. In general, −200 mesh sylvite particles are too small to be efficiently beneficiated in a froth flotation operation. The −200 mesh fraction is usually sent to brine clarification thickeners wherein the solids are permitted to settle out so that the clarified brine may be reused. The +200 mesh underflow is substantially free of slimes and other −200 mesh material and is introduced into a fines conditioner.

In the fines conditioner, the material is treated with a slime controllant in conventional manner and in conventional amount. Starch is a preferred slime controllant; however, other materials, for example the materials disclosed as slime control agents for the granular and coarse conditioning may be used. When the conditioned fines material is combined with the conditioned coarse material for flotation, a cationic flotation agent need not be added to the fines conditioner. However, when the fines conditioned material is separately treated in its own fine flotation circuit, a cationic flotation reagent is also added to the fines conditioner. In general, the cationic agents suitable for such use are the same as those described for use in the granular conditioner. The aliphatic amines for the fine conditioning may be of relatively lower molecular weight as compared to the aliphatic amines used in the granular conditioning. The fines conditioned material may be combined with the coarse conditioned material, as is shown in the drawing, and the combined materials subjected to froth flotation, or each conditioned material may be separately subjected to froth flotation.

In the plant scale test previously described during which 1,000 tons per day of −6 +20 mesh granular material (132 $K_2O$ tons per day) was treated in the granular flotation circuit, 9,700 tons per day of comminuted ore was introduced into the primary classifier. When operating in accordance with the present invention, the tailings from the granular flotation cell at the rate of 850 tons per day analyzed 4.7% $K_2O$ which represented 40 $K_2O$ tons per day. When the tailings were comminuted in the rod mill and subjected to flotation, 36 $K_2O$ tons per day of this material was recovered with only 4 $K_2O$ tons per day being lost. This illustrates the high overall recovery of $K_2O$ values when operating in accordance with the process herein described; the actual loss being only $4/132 \times 100 = 3.0\%$ of the $K_2O$ in the charge.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

We claim:

1. A process for beneficiating a potash ore which comprises dry sizing substantially uncomminuted mine run potash ore of substantially −5 inch size to separate out a substantially −6 +20 mesh granular flotation feed fraction and other fractions, separately from said other fractions and from comminuted ore, conditioning said granular fraction with a flotation reagent, and separately from said other fractions and from comminuted ore, subjecting the conditioned granular fraction to a froth flotation operation.

2. The process of claim 1 wherein said flotation is with a cationic flotation reagent.

3. The process of claim 2 wherein said cationic flotation reagent comprises an aliphatic amine.

4. The process of claim 1 wherein the tailings from said froth flotation operation are comminuted and subjected to a froth flotation operation.

5. The process of claim 1 wherein said potash ore is a sylvinite ore.

6. A process for beneficiating a mine run sylvinite ore which was released from the ore body by the use of explosives which comprises dry sizing a mine run ore of substantially −5 inch size prior to any substantial degree of comminuting of said mine run ore to separate out a substantially −6 +20 mesh granular flotation feed fraction and other fractions, separately from said other fractions and from comminuted ore, conditioning said granular flotation feed fraction with a cationic flotation reagent, separately from said other fractions and from comminuted ore, subjecting said conditioned granular flotation feed fraction to froth flotation, and removing a granular froth of high sylvite content from said froth flotation.

7. A process for beneficiating a mine run sylvinite ore which was released from the ore body by the use of explosives which comprises dry sizing a mine run ore of substantially −5 inch size to separate out a substantially −6 +20 mesh granular flotation feed fraction, an undersize fraction and an oversize fraction prior to any substantial degree of comminuting of said mine run ore, separately from said undersized fraction, said oversized fraction, and from comminuted ore, conditioning said granular flotation feed fraction with a cationic flotation reagent, separately from said undersized fraction, said oversized fraction, and from comminuted ore, subjecting said conditioned granular flotation feed fraction to froth flotation, recovering a granular froth of high sylvite content from said froth flotation, comminuting the oversize fraction from said dry sizing and combining the comminuted fraction with the undersize fraction from said dry sizing, and beneficiating the combined fractions in a froth flotation circuit.

8. A process for beneficiating a mine run sylvinite ore which was released from the ore body by the use of explosives which comprises dry sizing a mine run ore of substantially −5 inch size prior to any substantial degree of comminuting of the mine run ore to separate out a substantially −6 +20 mesh granular flotation feed fraction and other fractions, separately from said other fractions and from comminuted ore subjecting said granular flotation feed fraction to a desliming operation, separately from said other fractions and from comminuted ore subjecting the granular flotation feed fraction from the desliming operation to froth flotation with a cationic flotation reagent, and removing a granular froth of high sylvite content from said froth flotation.

9. A process for beneficiating a mine run sylvinite ore which was released from the ore body by the use of explosives which comprises dry sizing a mine run ore of substantially −5 inch size prior to any substantial degree of comminuting of the mine run ore to provide at least three fractions, a substantially −6 +20 mesh granular flotation feed fraction, an oversize fraction, and an undersize fraction, separately from said undersized fraction, said oversized fraction, and from comminuted ore subjecting said granular feed fraction to a desliming operation, separately from said undersized fraction, said oversized fraction, and from comminuted ore subjecting the granular flotation feed fraction from the desliming operation to froth flotation with a cationic flotation reagent, and removing a granular froth of high sylvite content from said froth flotation.

10. The process of claim 9 wherein said oversize fraction is comminuted and combined with said undersize fraction, and the combined material is beneficiated in a froth flotation circuit.

11. The process of claim 9 wherein said granular froth of high sylvite content removed from said froth flotation is subjected to a classification operation to remove relatively small particles.

12. The process of claim 9 wherein the tailings from said froth flotation operation are comminuted and subjected to a froth flotation operation.

13. The process of claim 9 wherein said cationic flotation reagent comprises an aliphatic amine.

14. A process for beneficiating a mine run sylvinite ore which was released from the ore body by the use of explosives which comprises dry sizing a mine run ore of substantially −5 inch size prior to any substantial degree of comminuting of the mine run ore to provide at least three fractions, a substantially −6 +20 mesh granular flotation feed fraction, an oversize fraction and an undersize fraction, separately subjecting said granular feed fraction to a desliming operation, separately subjecting the granular flotation feed fraction from the desliming operation to granular froth flotation with a cationic flotation reagent, separately removing a granular froth of high sylvite content and a tailing fraction from said granular froth flotation, comminuting said oversize fraction and combining the comminuted fraction with said undersize fraction, classifying the combined material to provide at least two fractions, a first finer fraction composed principally of finer particles of the combined material and a first coarser fraction composed principally of coarser particles of the combined material, comminuting said first coarser and said tailing fraction from the granular froth flotation combining said first coarser and said tailing fractions, separately subjecting the combined comminuted first coarser and tailing fractions to a sizing treatment to provide at least two fractions, a second finer fraction composed principally of the finer particles and a second coarser fraction composed principally of the coarser particles, combining at least a portion of said first finer fraction with at least a portion of said second finer fraction, separately conditioning at least a portion of the second coarser fraction with a cationic collecting agent and then separately subjecting the combined finer fraction and the conditioned second coarser fraction to froth flotation concentration and removing a froth of high sylvite content from said froth flotation concentration.

15. The process of claim 14 wherein said oversize fraction is comminuted to substantially −¼ inch size.

16. The process of claim 15 wherein said first coarser fraction and said tailing fraction from the granular froth flotation are comminuted in said comminution zone to about −8 mesh.

17. The process of claim 15 wherein said granular froth of high sylvite content removed from said granular froth flotation is subjected to a classification operation to remove relatively small particles and said small particles are subjected to flotation with said combined finer fraction and the conditioned second coarser fraction to froth flotation concentration.

18. The process of claim 14 wherein said first coarser and said tailing fraction from the granular froth flotation are comminuted in a slime mill.

19. The process of claim 14 in which said first coarser and said tailing fractions are combined and comminuted in a comminuation zone.

References Cited in the file of this patent

UNITED STATES PATENTS

| | | |
|---|---|---|
| 1,939,119 | Holt | Dec. 12, 1933 |
| 2,772,775 | Atwood | Dec. 4, 1956 |
| 2,826,370 | Weston | Mar. 11, 1958 |
| 2,836,297 | Smith | May 27, 1958 |
| 2,931,502 | Schoeld | Apr. 5, 1960 |
| 2,950,007 | Smith | Aug. 23, 1960 |
| 3,008,655 | Adams et al. | Nov. 14, 1961 |
| 3,037,624 | Jackson et al. | June 5, 1962 |

FOREIGN PATENTS

| | | |
|---|---|---|
| 528,535 | Canada | July 31, 1956 |